(12) United States Patent
Krutsch et al.

(10) Patent No.: US 9,307,249 B2
(45) Date of Patent: Apr. 5, 2016

(54) PROCESSING DEVICE AND METHOD OF COMPRESSING IMAGES

(71) Applicants: Robert Cristian Krutsch, Munich (DE); Valentin-Adrian Gancev, Munich (DE); Thomas Richardson Tewell, Austin, TX (US)

(72) Inventors: Robert Cristian Krutsch, Munich (DE); Valentin-Adrian Gancev, Munich (DE); Thomas Richardson Tewell, Austin, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/310,005

(22) Filed: Jun. 20, 2014

(65) Prior Publication Data

US 2015/0373331 A1  Dec. 24, 2015

(51) Int. Cl.
*G06K 9/46* (2006.01)
*H04N 19/136* (2014.01)
*H04N 19/167* (2014.01)
*G06T 1/20* (2006.01)
*G06T 9/20* (2006.01)
*G06T 11/00* (2006.01)
*H04N 19/119* (2014.01)
*H04N 19/14* (2014.01)
*H04N 19/436* (2014.01)

(52) U.S. Cl.
CPC ............... *H04N 19/136* (2014.11); *G06T 1/20* (2013.01); *G06T 9/20* (2013.01); *G06T 11/00* (2013.01); *H04N 19/119* (2014.11); *H04N 19/14* (2014.11); *H04N 19/167* (2014.11); *H04N 19/436* (2014.11)

(58) Field of Classification Search
USPC .......... 382/243, 232, 239, 291, 173; 114/274, 114/282; 345/419, 427, 418, 502, 506, 519, 345/522, 582, 587, 611, 613; 358/1.8; 434/307 R, 365; 348/383; 440/88 C
See application file for complete search history.

(56) References Cited

U.S. PATENT DOCUMENTS

| 6,362,828 | B1 * | 3/2002 | Morgan | 345/582 |
| 6,717,576 | B1 * | 4/2004 | Duluk et al. | 345/419 |
| 7,167,181 | B2 * | 1/2007 | Duluk et al. | 345/506 |
| 7,808,503 | B2 * | 10/2010 | Duluk et al. | 345/506 |
| 2005/0207569 | A1 | 9/2005 | Zhang et al. | |

(Continued)

OTHER PUBLICATIONS

Advanced Micro Devices, Inc., "JPEG Decoding with Run-Length Encoding: A CPU and GPU Approach," AMD Developer Central; downloaded from <<http://developer.amd.com/resources/documentation-articles/articles-whitepapers/jpeg-decoding-with-run-length-encoding-a-cpu-and-gpu-approach/>> on Jun. 17, 2014, 6 pages.

(Continued)

*Primary Examiner* — Anh Do (57) ABSTRACT

The present application relates an encoder. The encoder partitions an image domain into several substructures each having one of at least one size dimension, and defines at least one geometric primitive for each substructure on the basis of geometry data. The encoder also retrieves, for each substructure, a subset of image data and determines whether pixel values of the retrieved subset are the same. If the pixel values are describable by a texture mapping operation, then the encoder defines a compressed texture image and assigns texture mapping data to the geometry data. Otherwise, the encoder defines an uncompressed texture image and assigns texture mapping data to the geometry data. The compressed image includes the geometry data, the texture mapping data, and the texture image data.

20 Claims, 6 Drawing Sheets

(56) References Cited

U.S. PATENT DOCUMENTS

2008/0159639 A1 7/2008 Dvir et al.
2014/0044371 A1 2/2014 Madanbashi et al.

OTHER PUBLICATIONS

Freescale Semiconductor, Inc., "Chapter 38: Run-Length Encoding Decoder (RLE_DEC)," MPC5645S Microcontroller Reference Manual, Devices Supported: MPC5645S; Rev. 7; Feb. 2014; 15 pages.

Nguyen, Hubert; Chapter 36 of "GPU Gems 3", published in 2007; downloaded from <<http://http.developer.nvidia.com/GPUGems3/gpugems3_ch36.html>> on May 11, 2014, 18 pages.

Shi, W. et al. "A Digital Rights Enabled Graphics Processing System," Graphics Hardware, 2006 Proceedings of the 21st ACM SIGGRAPH/EUROGRAPHICS symposium on Graphics hardware, ISBN:3-905673-37-1; 2006; 10 pages.

U.S. Appl. No. 14/553,173, filed Nov. 25, 2014, entitled "Method and Apparatus for Encoding Image Data".

Non-Final Office Action mailed Feb. 1, 2016 for U.S. Appl. No. 14/553,173, 17 pages.

* cited by examiner

PROCESSING DEVICE AND METHOD OF COMPRESSING IMAGES

CROSS REFERENCE TO RELATED APPLICATION(S)

The present application is related to co-pending U.S. patent application Ser. No. 14/553,173, entitled "Method and Apparatus for Encoding Image Data," filed on Nov. 25, 2014, the entirety of which is herein incorporated by reference.

FIELD OF THE INVENTION

This invention relates to a processing device and to a method of compressing images, in particular of compressing images using texture mapping. More particularly, the compressed images are decodable making use of functionalities of graphics processing subsystems having vertex and texture shaders.

BACKGROUND OF THE INVENTION

Image compression is widely used to minimize the space required to store images. Whereas the known image compression methodologies are optimized in view of storage requirements resources required to uncompress/decode compressed images are considered of marginal concern. Image compression methodologies having high compression ratios are typically processing and bandwidth demanding. In particular processing systems with limited capabilities which would benefit from the reduced storage space demand due to high compression ratios are often not capable to provide the required processing and bandwidth capabilities.

In the state of the art, approaches are known to leverage specific or dedicated hardware solutions for uncompressing/decoding compressed images. For instance, the use of OpenCL kernels applicable with a large number of today's graphics processing subsystem is suggested; cf. for instance "http://developer.amd.com/resources/documentation-articles/articles-whitepapers/jpeg-decoding-with-run-length-encoding-a-cpu-and-gpu-approach!". This approach reduces the requirement of processing resources provided by a general purpose processor in that functionalities of a graphics processing subsystem are employed but does still involves high bandwidth consumption between memory and graphics processing subsystem.

The consideration applies to dedicated hardware solutions, which also reduces the requirement of processing resources provided by a general purpose processor but disregard the bandwidth consumption due to data transfers from and to memory.

SUMMARY OF THE INVENTION

The present invention provides a processing device and a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

In the drawings.

DETAILED DESCRIPTION OF THE PREFERRED EMBODIMENTS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

It is understood that the following disclosure provides many different embodiments, or examples, capable of implementing different features. Specific examples of components and arrangements are described below to simplify and thus clarify the present disclosure. These are, of course, merely examples and are not intended to be limiting. In many instances, the features of one embodiment may be combined with the features of other embodiments. In addition, the present disclosure may repeat reference numerals and/or letters in the various exemplary embodiments. This repetition is for the purpose of simplicity and clarity and does not itself dictate a relationship between the various embodiments and/or configurations discussed.

Figure 1:
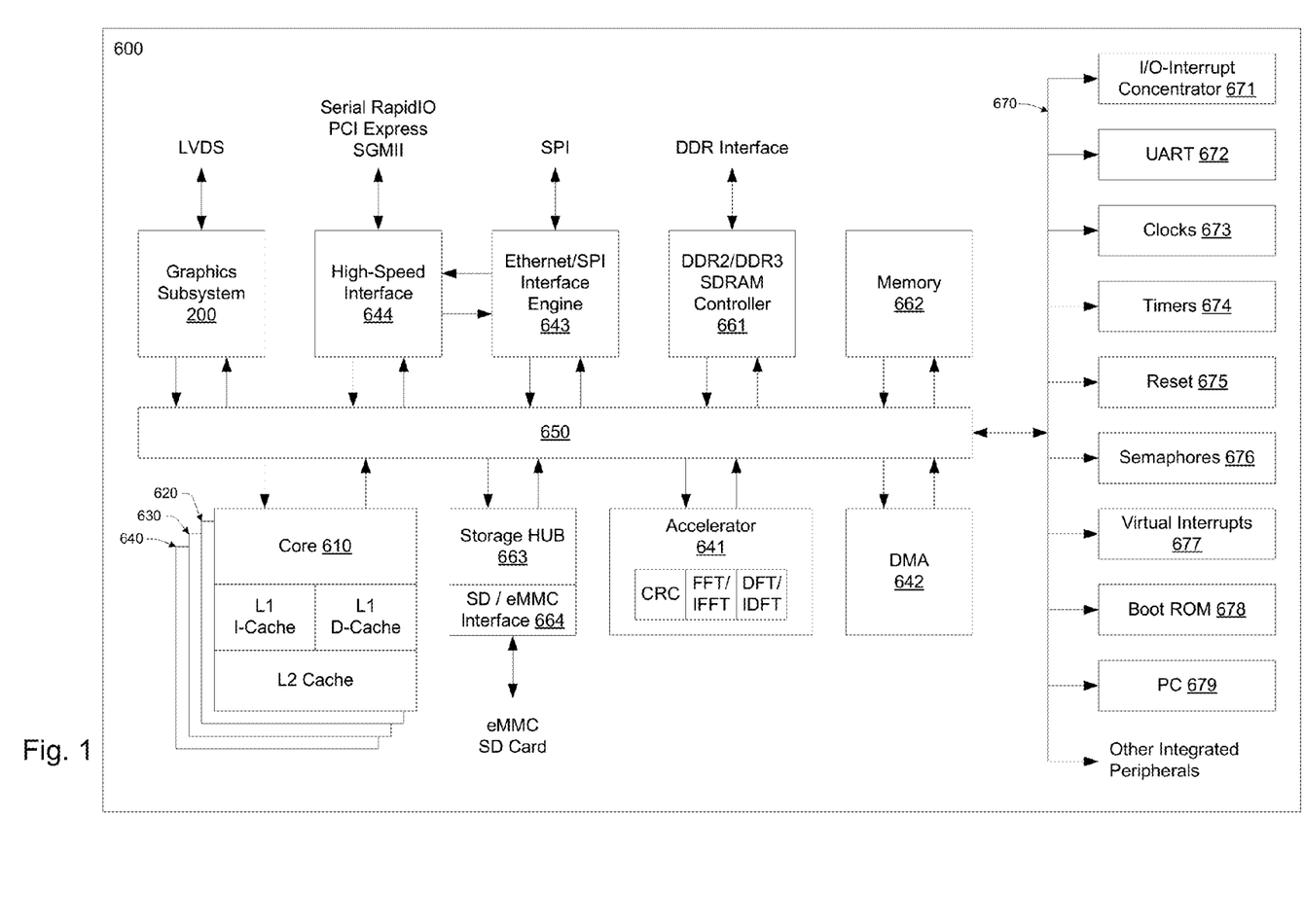
FIG. 1 schematically illustrates a block diagram of a system on chip (SoC) device that may be used to implement an example of the present invention.

Referring now to FIG. 1, there is shown a simplified schematic diagram of a multi-core system on chip 600 having multiple processor cores 610, 620, 630, 640. As illustrated, each of the processor cores 610, 620, 630, 640 is coupled to one or more levels of cache memory, such as an L1 instruction cache (I-Cache), L1 data cache (D-Cache), and/or L2 cache. While the processor cores 610, 620, 630, 640 may be identically designed or homogenous, the multi-core SoC may also include one or more cores having a different design. For example, the depicted multi-core SoC 600 also includes an accelerator 641 which may include one or more processor cores for supporting hardware acceleration for DFT/iDFT and FFT/iFFT algorithms and for CRC processing. Each processor core is coupled across an interconnect bus 650 to one or more memory controllers 661, which are coupled in turn to one or more banks of system memory (not shown). The interconnect bus 650 also couples the processor cores to a Direct Memory Access (DMA) controller 642, network interface 643, a high speed serial interface 644, and to other hardware-implemented integrated peripherals 671 to 679. The interconnect bus 650 may be a coherency fabric.

Each of the processor cores 610, 620, 630, 640 may be configured to execute instructions and to process data according to a particular instruction set architecture (ISA), such as x86, PowerPC, SPARC, MIPS, and ARM, for example. Those of ordinary skill in the art also understand the present invention is not limited to any particular manufacturer's microprocessor design. The processor core may be found in many forms including, for example, any 32-bit or 64-bit microprocessor manufactured by Freescale, Motorola, Intel, AMD, Sun or IBM. However, any other suitable single or multiple microprocessors, microcontrollers, or microcomputers may be utilized. In the illustrated embodiment, each of the processor cores 610, 620, 630, 640 may be configured to operate independently of the others, such that all cores may execute in parallel. In some embodiments, each of cores may be configured to execute multiple threads concurrently, where a given thread may include a set of instructions that may execute independently of instructions from another thread. Such a core may also be referred to as a multithreaded (MT) core. Thus, a single multi-core SoC 600 with four cores will be capable of executing a multiple of four threads in this configuration. However, it should be appreciated that the invention is not limited to four processor cores and that more or fewer cores can be included. In addition, the term "core" refers to any combination of hardware, software, and firmware typically configured to provide a processing functionality with respect to information obtained from or provided to associated circuitry and/or modules (e.g., one or more peripherals, as described below). Such cores include, for example, digital signal processors (DSPs), central processing units (CPUs), microprocessors, and the like. These cores are often also referred to as masters, in that they often act as a bus master with respect to any associated peripherals. Furthermore, the term multi-core (or multi-master) refers to any combination of hardware, software, and firmware that that includes two or more such cores (e.g., cores 610 and 620), regardless of whether the individual cores are fabricated monolithically (i.e., on the same chip) or separately. Thus, a second core may be the same physical core as first core, but has multiple modes of operation (e.g., a core may be virtualized).

As depicted, each processor core (e.g., 610) may include a first level (L1) cache which includes a data cache (D-Cache) and an instruction cache (I-Cache). In addition, a second level of cache memory (L2) may also be provided at each core, though the L2 cache memory can also be an external L2 cache memory which is shared by one or more processor cores. The processor core 610 executes instructions and processes data under control of the operating system (OS) which may designate or select the processor core 610 as the control or master node for controlling the workload distribution amongst the processor cores 610, 620, 630, 640. Communication between the cores 610, 620, 630, 640 may be over the interconnect bus 650 or over a crossbar switch and appropriate dual point to point links according to, for example, a split-transaction bus protocol such as the HyperTransport (HT) protocol (not shown).

The processor cores 610, 620, 630, 640 and accelerator 641 are in communication with the interconnect bus 650 which manages data flow between the cores and the memory. The interconnect bus 650 may be configured to concurrently accommodate a large number of independent accesses that are processed on each clock cycle, and enables communication data requests from the processor cores 610, 620, 630, 640 to external system memory and/or an on-chip non-volatile memory 662, as well as data responses therefrom. In selected embodiments, the interconnect bus 650 may include logic (such as multiplexers or a switch fabric, for example) that allows any core to access any bank of memory, and that conversely allows data to be returned from any memory bank to any core. The interconnect bus 650 may also include logic to queue data requests and/or responses, such that requests and responses may not block other activity while waiting for service. Additionally, the interconnect bus 650 may be configured as a chip-level arbitration and switching system (CLASS) to arbitrate conflicts that may occur when multiple cores attempt to access a memory or vice versa.

The interconnect bus 650 is in communication with main memory controller 661 to provide access to the optional SOC internal memory 662 or main memory (not shown). Memory controller 661 may be configured to manage the transfer of data between the multi-core SoC 600 and system memory, for example. In some embodiments, multiple instances of memory controller 661 may be implemented, with each instance configured to control a respective bank of system memory. Memory controller 661 may be configured to interface to any suitable type of system memory, such as Double Data Rate or Double Data Rate 2 or Double Data Rate 3 Synchronous Dynamic Random Access Memory (DDR/DDR2/DDR3 SDRAM), or Rambus DRAM (RDRAM), for example. In some embodiments, memory controller 661 may be configured to support interfacing to multiple different types of system memory. In addition, the Direct Memory Access (DMA) controller 642 may be provided which controls the direct data transfers to and from system memory via memory controller 661.

The interconnect bus 650 is in communication with storage HUB 663 to provide access to mass storage (not shown). The storage HUB 663 may be configured to manage the transfer of data between the multi-core SoC 600 and mass storage units, for example. The storage HUB 663 may further include one or more interfaces specific for the technology used by the mass storage units. Herein, the storage HUB 663 is exemplarily illustrated to include a SD/eMMC Interface 664, which is provided to allow for access to SD (Secure Data), MMC (MultiMediaCard) cards (not shown) and/or eMMC (embedded MultiMediaCard) (not shown). Both storage technologies are implemented on the basis of non-volatile flash memory technology. In some embodiments, multiple instances of storage HUB 663 and/or interfaces provided with the storage HUB 663 may be implemented, with each instance configured to control a respective bank of system memory. Memory storage HUB 663 may be configured to interface to any suitable type of mass storage interfacing standards including in particular flash memory storage standards (SD, MMC), SAS (Serial Attached SCSI), SATA (Serial ATA) and the like.

The multi-core SoC 600 may comprise a dedicated graphics sub-system 200. The graphics sub-system 200 may be configured to manage the transfer of data between the multi-core SoC 600 and graphics sub-system 200, for example, through the interconnect bus 650. The graphics sub-system 200 may include one or more processor cores for supporting hardware accelerated graphics generation. The graphics generated by the graphics sub-system 200 may be outputted to one or more displays via any display interface such as LVDS, HDMI, DVI and the like.

As will be appreciated, the multi-core SoC 600 may be configured to receive data from sources other than system memory. To this end, a network interface engine 643 may be configured to provide a central interface for handling Ethernet and SPI interfaces, thus off-loading the tasks from the cores. In addition, a high speed serial interface 644 may be configured to support one or more serial RapidIO ports, a PCI-Express Controller, and/or a serial Gigabit Media Independent Interface (SGMII). In addition, one or more interfaces 670 may be provided which are configured to couple the cores to external boot and/or service devices, such as I/O interrupt concentrators 671, UART device(s) 672, clock(s) 673, timer(s) 674, reset 675, hardware semaphore(s) 676, virtual interrupt(s) 677, Boot ROM 678, I2C interface 679, GPIO ports, and/or other modules.

Figure 2:
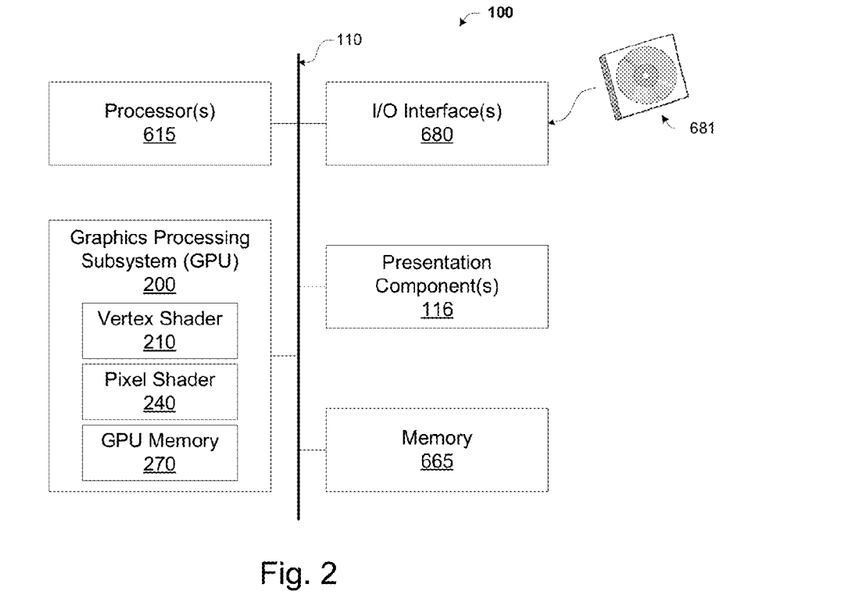
FIG. 2 schematically illustrates a block diagram of a generalized processing device that may be used to implement an example of the present invention.

With continued reference to FIG. 2, processing device or computing device 100 is schematically illustrated. The processing device or computing device of FIG. 2 is a processing device applicable in the context of the present application and generalized in view of the SoC exemplarily illustrated in FIG. 1. The computing device 100 includes a bus 110 that directly or indirectly couples the following devices: memory 665, one or more processors 615, one or more presentation components 116, input/output (I/O) interfaces 680, and a graphics processing subsystem (GPU) 200. The bus 110 represents what may be one or more busses (such as an address bus, data bus, or combination thereof). Although the various blocks of FIG. 2 are shown with lines for the sake of clarity, in reality, delineating various components is not so clear, and metaphorically, the lines would more accurately be grey and fuzzy. For example, one may consider a presentation component such as a display device to be an I/O component connected through one of the I/O interfaces 680. Also, CPUs and GPUs may have memory. The diagram of FIG. 2 is merely illustrative of an exemplary computing device that can be used in connection with one or more embodiments of the invention. Distinction is not made between such categories as "workstation," "server," "laptop," "handheld device," etc., as all are contemplated within the scope of FIG. 2 and reference to "computer" or "computing device."

Computing device 100 typically includes a variety of computer-storage media, in particular non-tangible transitory computer readable media 681 operatively (readably and/or writeably) coupled to the computing device 100 via one of the I/O interfaces 680 thereof. Computer-storage media may comprise Random Access Memory (RAM); Read Only Memory (ROM); Electronically Erasable Programmable Read Only Memory (EEPROM); flash memory; Compact Disk Read-Only Memory (CDROM), digital versatile disks (DVDs) or other optical or holographic media; magnetic cassettes, magnetic tape, magnetic disk storage or other magnetic storage devices.

Memory 665 includes computer-storage media in the form of volatile and/or nonvolatile memory. The memory 665 may be removable, non-removable, or a combination thereof. Exemplary memory includes solid-state memory, hard drives, optical-disc drives, etc. Computing device 100 includes one or more processors 615 that read data from various entities such as bus 110, memory 665 or via the I/O interfaces 680. Presentation component(s) 116 present data indications to a user or other device. Exemplary presentation components 116 include a display device, speaker, printing component, vibrating component, etc. The I/O interfaces 680 allow computing device 100 to be logically coupled to other devices, some of which may be built in. include a microphone, joystick, game pad, satellite dish, scanner, printer, wireless device, etc.

Components of the computing device 100 may be used in image processing. For example, the computing device 100 may be used to implement a graphics pipeline, similar to graphics pipeline of FIG. 3, which processes and applies various effects and adjustments to a raw image. Graphic pipelines include a series of operations that are performed on a digital image. These pipelines are generally designed to allow efficient processing of a digital image, while taking advantage of available hardware.

Figure 3:
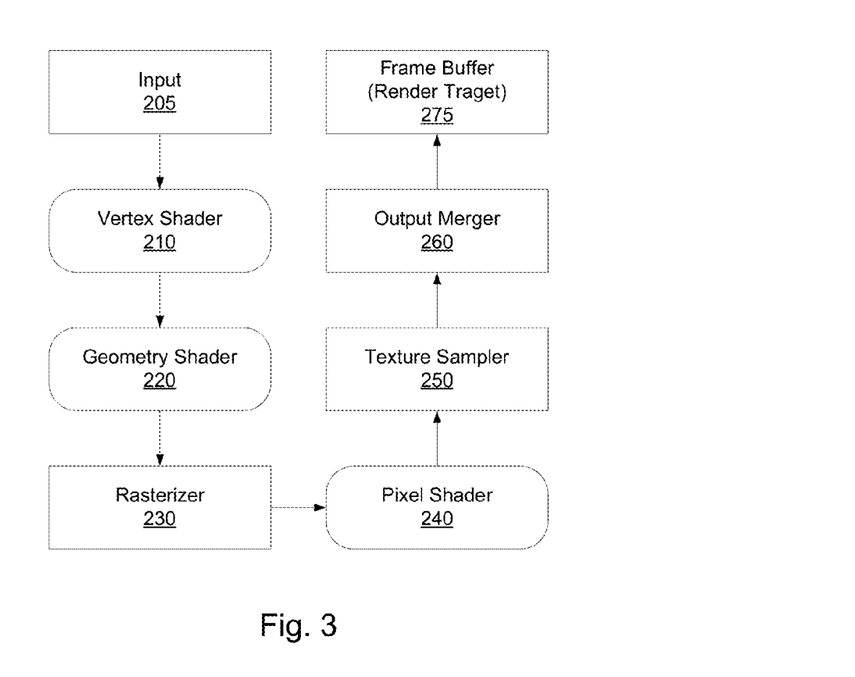
FIG. 3 schematically shows a block diagram of an exemplary graphics pipeline implemented in a graphics subsystem of a device capable of processing data.

To implement a graphics pipeline, one or more procedural shaders on the GPU 200 are utilized. Procedural shaders are specialized processing subunits of the GPU 200 for performing specialized operations on graphics data. An example of a procedural shader is a vertex shader 210, which generally operates on vertices. For instance, the vertex shader 210 can apply computations of positions, colors and texturing coordinates to individual vertices. The vertex shader 210 may perform either fixed or programmable function computations on streams of vertices specified in the memory of the graphics pipeline. Another example of a procedural shader is a pixel shader 240. For instance, the outputs of the vertex shader 210 can be passed to the pixel shader 240, which in turn operates on each individual pixel. After a procedural shader concludes its operations, the information may be placed in a GPU memory 270. The information may be presented on an attached display device or may be sent back to the host for further operations.

The GPU memory 270 provides a storage location on the GPU 200 where an image may be stored. As various image processing operations are performed with respect to an image, the image may be accessed from the GPU memory 270, altered, and then re-stored on the memory 270. The GPU memory 270 allows the image being processed to remain on the GPU 200 while it is transformed by a graphics pipeline. As it is time-consuming to transfer an image from the GPU 200 to the memory 665, it may be preferable for an image to remain on the GPU memory 270 until processing operations are completed.

With respect to the pixel shader 240, specialized pixel shading functionality can be achieved by downloading instructions to the pixel shader 240. Furthermore, the functionality of many different operations may be provided by instruction sets tailored to the pixel shader 240 and other components such as a rasterizer. For example, negating, remapping, biasing, and other functionality are useful for many graphics applications. The ability to program the pixel shader 240 is advantageous for graphics operations, and specialized sets of instructions may add value by easing development and improving performance. By executing these instructions, a variety of functions can be performed by the pixel shader 240, assuming the instruction count limit and other hardware limitations of the pixel shader 240 are not exceeded. The pixel shader 240 and other components may receive instructions through one or more application program interfaces.

With reference to FIG. 3, an exemplary graphics pipeline is illustratively shown. The graphics pipeline includes the stages for transforming data into images that may be displayed on a display device. The graphics pipeline includes an input assembler 205, vertex shader 210, geometry shader 220, rasterizer 230, pixel shader 240, texture sample 250, and output merger 260. The image produced by the graphics pipeline may be written to a render target 275. The graphics pipeline depicted in FIG. 3 is exemplary, and additional components may be added or components removed.

Input assembler 205 reads vertices out of memory and forms geometry and creates pipeline work items. Vertex shader 210 is a graphics processing function used to add special effects to objects in a 3D environment by performing mathematical operations on the objects' vertex data. Geometry shader 220 generates new geometric primitives, such as points, lines, and triangles, from those primitives that were sent to the beginning of the graphics pipeline. Rasterizer 230 converts scene data into a raster image (e.g. pixels) for output to a display or file. The rasterizer 230 may sample the scene data several sub-pixels per pixel. Pixel shader 240 serves to manipulate a pixel color, usually to apply an effect on an image, for example; realism, bump mapping, shadows, anti-aliasing, and explosion effects. It is a graphics function that calculates effects on a per-pixel basis. The texture sampler 250 is utilized by the vertex shader 210, geometry shader 220, and pixel shader 240 to fetch data from memory. The texture sampler 250 can perform texture filtering operations, texture addressing modes such as clamp or wrap, convert between different format on reads and select multum in parvo (MIP) levels based on level of detail (LOD) values. Output merger 260 performs blend, depth and stencil operations. The image produced by the output merger 260 is written to the render target 275, which is for example a frame buffer temporarily storing the image shown on a display to the user.

Figure 4:
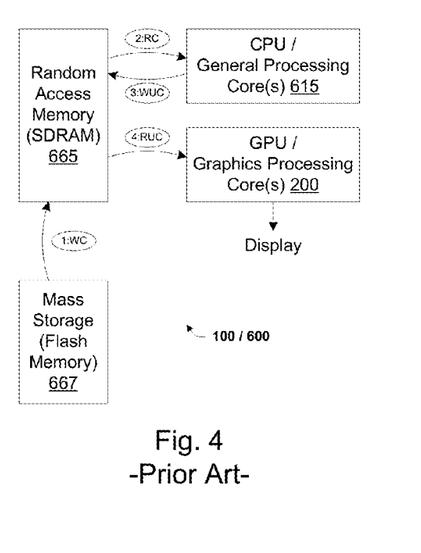
FIG. 4 schematically shows an exemplary flow diagram illustrating the data flow and processing operations for displaying a compressed image in accordance with the state of the art.

With reference to FIG. 4, a data flow, which occurs at a processing device when displaying a compressed image in accordance with a compression decoding method of the state of the art, is schematically illustrated. The objective of image compression may be considered to reduce irrelevance and redundancy of the image data in order to be able to reduce the amount of data that would otherwise be needed to store, handle, and/or transmit the represented image data. Different compression encoding methods are known and may be differentiated into lossy and lossless compression encoding methods.

"Lossy" compression is the class of data encoding methods that uses inexact approximations (or partial data discarding) for representing the content that has been encoded. Using lossy compression encoding methods, a substantial amount of data reduction is often possible before the result is sufficiently degraded to be noticed by the user. Even when the degree of degradation becomes noticeable, further data reduction may often be desirable for some applications (e.g., to make real-time communication possible through a limited bit-rate channel, to reduce the time needed to transmit the content, or to reduce the necessary storage capacity). Lossless compression encoding methods are used in cases where it is important that the original and the decompressed data be identical, or where deviations from the original data could be deleterious.

A specific lossless compression encoding method is the so-called run length encoding (RLE). Run length encoding is a form of encoding method, which considers sequences, in which the same data value occurs in many consecutive data elements, the so-called "runs", for compression. Using RLE, runs of data are stored as a single data value and count, rather than as the original run. This is most useful on data that contains many such runs, i.e., many sequences in which the same data value occurs in many consecutive data elements. For example, RLE may be applied to substantially compress graphic images such as icons, line drawings, schematic drawings, and images with uniform background.

With reference to FIG. 4, the data flow of an RLE compressed image to be displayed is schematically illustrated. The image data of the RLE compressed image to be displayed is provided in a mass storage such as the exemplary non-volatile flash memory 667. In a first stage "1:WC", the data of the compressed image (abbreviated as "C") is read from the flash memory exemplifying a mass storage and written (abbreviated as "W") to the random access main memory 665 of the processing device 600 or 100. In a second stage "2:RC", the data of the compressed image ("C") is read ("R") from the main memory 665 and provided to the one or more processors/cores 615, 610 to 640 for uncompressing operation. In a third stage "3:WUC", the data of the uncompressed image (abbreviated as "UC") is written ("W") back to the random access main memory 665. In a fourth and final stage ("4:RUC"), the data of the uncompressed image ("UC") that now lie in the main memory 665 is read out and provided/supplied to the graphics subsystem 200 of the processing device 100, 600 such as a Graphics Processing Unit (GPU) having several cores e.g. applicable for Single-Instruction Multiple-Thread (SIMT) parallelism. The graphics subsystem 200 outputs the image on a display. The image may be subject to further image processing operations performed by the graphics subsystem. As immediately understood by those skilled in the art of image and graphics processing, the storage space, which has to be provided in the random access memory 665, should be sufficient for storing the data of the compressed image and the data of the uncompressed image because the uncompressing operation performed by the processors/cores 615, 610 to 640 is typically operated section-wise. Further, data bus bandwidth is extensively allocated by the decompressing operation because the data of compressed image is read by the processors/cores 615, 610 to 640 from the main memory 665, the data of the uncompressed data is written back by the processors/cores 615, 620 to 640 to the main memory 665 and the data of the uncompressed data is finally read by the graphics subsystem 200 from the main memory 665.

Figure 5:
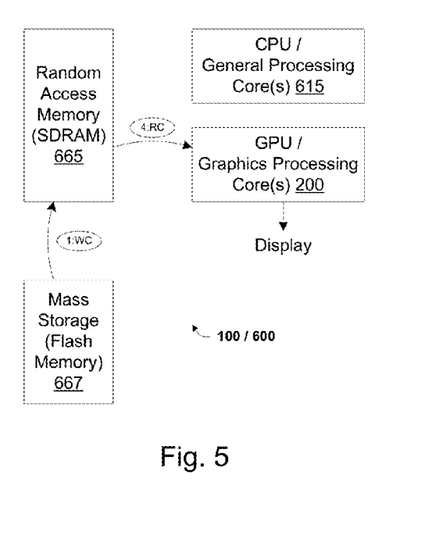
FIG. 5 schematically shows an exemplary flow diagram illustrating data flow and processing operations for displaying a compressed image encoded in accordance with an example of the image encoding operation of the present application.

In order to minimize the use of resources of the processing device 100/600 for displaying a compressed image, the present application suggests a image compression methodology, which leverages the capabilities, functionalities and resources provided by graphics subsystems 200, in particular capabilities, functionalities and resources as described above with reference to FIGS. 2 and 3. In order to allow for taking advantages of the capabilities, functionalities and resources of such graphics subsystem 200, the image compression methodology according to an example of the present application suggests a compression enclosing method, which enables such graphics subsystem 200 for uncompressing an image in compressed form. With reference to FIG. 5, a data flow, which occurs at a processing device when displaying a compressed image in accordance with an example of the compression encoding method of the present application, is schematically illustrated. In a first stage, "1:WC", the data of the compressed image (abbreviated as "C") is read from the flash memory exemplifying a mass storage and written (abbreviated as "W") to the random access main memory 665 of the processing device 600 or 100. In a second stage "2:RC", the data of the compressed image ("C") is read ("R") from the main memory 665 and provided/supplied to the graphics subsystem 200 of the processing device 100, 600 for uncompressing and displaying operations. The image may be subject to further image processing operations performed by the graphics subsystem.

An example of the compression enclosing method will be described in the following with reference to FIGS. 6 to 8. The unprocessed image is supplied to an encoder 300, which may be implemented in software and may make use of the functionality of one or more hardware components, in particular the functionality of one or more hardware components of a graphics subsystem 200. It should be noted that the terms encoding and compressing and the terms decoding and uncompressing are used synonymously.

The encoder 300 is operatively coupled to a memory such the main memory 665, which stores the data of the uncompressed image. The data of the uncompressed image may be supplied or streamed from the memory to the encoder 300 or may be read bunch-wise by the encoder 300 from the memory. The encoder 300 generates geometry data (primitive position data), texture mapping data (or texture coordinate data) and texture image data, the totality of which form the data of the compressed image as schematically illustrated in FIG. 7. The data generated and outputted by the encoder 300 may be written to the memory for being stored thereat for later use.

Figure 6:
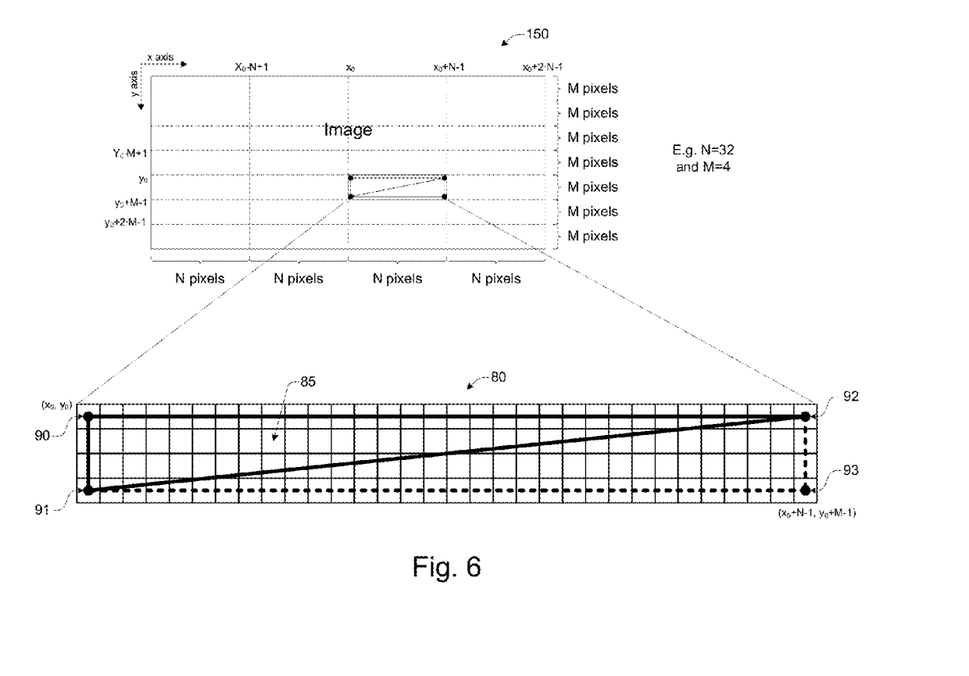
FIG. 6 schematically shows a block diagram illustrating partitioning of an image domain on the basis of geometric primitives according to an example of the present application.

In accordance with an example of the compression encoding method of the present application, the domain of the uncompressed image is partitioned or subdivided into several substructures as schematically illustrated in FIG. 6. Each substructure has a size dimension, which may be predetermined at the encoder 300 or supplied thereto, provided by user input, or determined by the encoder 300 in response to an analysis of the image to be compressed. Such an analysis may consider the size of image subsections having image pixels with the same value. At least one size dimension is provided. The substructures may all have the same size dimension or the size dimension may vary among the substructures. In the example shown in FIG. 6, the exemplarily illustrated substructures 80 have an exemplary size dimension of 32×4 pixels 85. Each substructure is defined on the basis of at least one geometric primitive. The term geometric primitive as such is used in the field of computer graphics and should be understood as relating to a geometric object, herein a two-dimensional geometric object. The geometric object may be further understood to relate to a definition of a geometric shape. Properties of the geometric object may include positioning and texturing of the object surface. At least one geometric primitive of the substructure is defined for each substructure on the basis of geometry data defining a positioning (positional arrangement) of the at least one geometric primitive within the image space. The at least one geometric primitive represents geometrically each respective substructure. In the example shown in FIG. 6, the substructure is defined on the basis of two triangles. Each of the triangles is further defined on the basis of three position coordinates defining the positioning of the respective triangle within the image space. The coordinates 90, 91 and 92 for instance define the first triangle and the coordinates 91, 92 and 93 define the second triangle. The positions of the triangles within the image space are for instance defined by the coordinate 90 defining the position $(x, y)=(x_0, y_0)$, coordinate 91 defining the position $(x_0, y_0+M-1)$, wherein for instance M=3 as illustratively depicted in FIG. 6, coordinate 92 defining the position $(x_0+N-1, y_0)$, wherein for instance N=32 as illustratively depicted in FIG. 6, and coordinate 93 defining the position $(x_0+N-1, y_0+M-1)$. Accordingly, the positioning of the substructure within the image space is defined on the basis of the positioning of the one or more geometric primitives, the totality of which defining the substructure. It should be noted that the geometric primitives of a substructure may have common coordinates as exemplarily illustrated in FIG. 6 with respect to coordinates 91 and 92.

As described above, the image domain is partitioned into substructures each of which defined on the basis of at least one geometric primitive. Each of the geometric primitives provides a two-dimensional surface, which is to be filled with an image detail of the unprocessed image in accordance with the positioning of the substructure. The texture mapping operation is applied for texture lookup to determine the texture pixels, the so-called texels, from a texture image to fill the surface. The texture image data represents the data basis, onto which the texture mapping operation are applied to fill the surface. In other words, a two-dimensional texture image is mapped or glued to the surface of the graphic primitive. The two-dimensional texture image is defined in texture image space and a so-called texture lookup, which is the texture mapping, is performed using interpolated texture coordinates to determine the pixels to fill the surface of the graphic primitive.

The image data corresponding to each substructure (in accordance with the positioning of the substructure within the image space) is further analyzed in order to consider whether the image data thereof may be compressible or not. In response to the analysis result, a texture image is generated for each of the substructures.

Change of pixel values of the image data subset is describable on the basis of a texture mapping operation in the pixel value space of the texture image. Texture mapping operations include for instance interpolation operations such as nearest neighbor sampling, linear interpolation, bilinear interpolation, cubic interpolation and be-cubic interpolation. In the context of the present application, data should be considered to be compressible if the retrieved pixel values of the subset of image data are describable on the basis of a texture mapping operation and selected pixel values of the subset of image data. In the following, examples are described of the sake of a deeper understanding.

Image Data Subset with Similar Pixel Values

The subset of data of the image corresponding to the substructure is retrieved and it is determined from the subset of image data whether the pixel values of the retrieved subset of image data have the same pixel value or have similar values. Similar pixel values should be understood in that the pixel values differ within a predefined distance (color range) in color space. This means that the predefined distance in color space allows for defining a measure of similarity of the pixel values. Quantifying metrics are known in the art to determine the difference or distance between two colors in color space: For instance, such metrics make use of the Euclidean distance in a device independent color space.

If the pixel values have the same value or similar pixel values then data of a texture image in compressed form is defined, which has a single pixel with a pixel value corresponding to the same pixel value or a pixel value representative of the pixel values differing within a predefined distance in color space. The representative pixel value may be an average pixel value with respect to the color space. Hence, the texture image only comprises one pixel having assigned the pixel value resulting from the analysis of the subset of image data. Texture mapping data is assigned to the geometry data of the substructure, which texture mapping data enables mapping the defined compressed texture image onto the surface of the at least one geometric primitive of the substructure.

Image Data Subset with Color Gradient

The subset of data of the image corresponding to the substructure is retrieved and it is determined from the subset of image data whether the pixel values of the retrieved subset of image data change in accordance with a color gradient extending over the range of the image data subset. The change of pixel values may follow a color gradient within a predefined range of variation described by a distance in color space.

If the pixel values are determined to show a color gradient extending over the substructure describable by initial gradient values and final gradient values then data of a texture image in compressed form is defined, which has pixels with pixel values corresponding to initial gradient values and pixels with pixel values corresponding to final gradient values. In particular, each of the gradient values comprises one or two initial gradient values depending on the interpolation mapping operation used. The texture mapping operation reconstructs the color gradient by interpolation between the initial gradient values and the final gradient values to obtain the values lying in-between in texture pixel space. The interpolation operation may be a linear interpolation operation on the basis of one gradient value and the final gradient value, a cubic interpolation operation on the basis of one gradient value and the final gradient value, a bi-linear interpolation operation on the basis of one or two gradient values and the one or two final gradient values, or bi-cubic interpolation operation on the basis of one or two gradient values and the one or two final gradient values. Hence, the texture image only comprises two to four pixels having assigned the pixel values resulting from the analysis of the subset of image data. Texture mapping data is assigned to the geometry data of the substructure, which texture mapping data enables mapping the defined compressed texture image onto the surface of the at least one geometric primitive of the substructure.

Otherwise, if the subset of image data is considered not to be compressible (e.g., the pixel values of the image data subset are not describable on the basis of a texture mapping operation and selected pixel values of the image data subset), data of a texture image in uncompressed form is defined. The data of the texture image in uncompressed form comprises pixels with pixel values corresponding to the pixel values of the retrieved subset of image data. Texture mapping data is assigned to the geometry data of the substructure, which texture mapping data enables mapping the defined texture image onto the at least one geometric primitive of the substructure.

The compressed form of the image provided to the encoder 300 comprises the geometry data, the texture mapping data and the texture image data for each substructure, which is outputted by the encoder 300.

Figure 8:
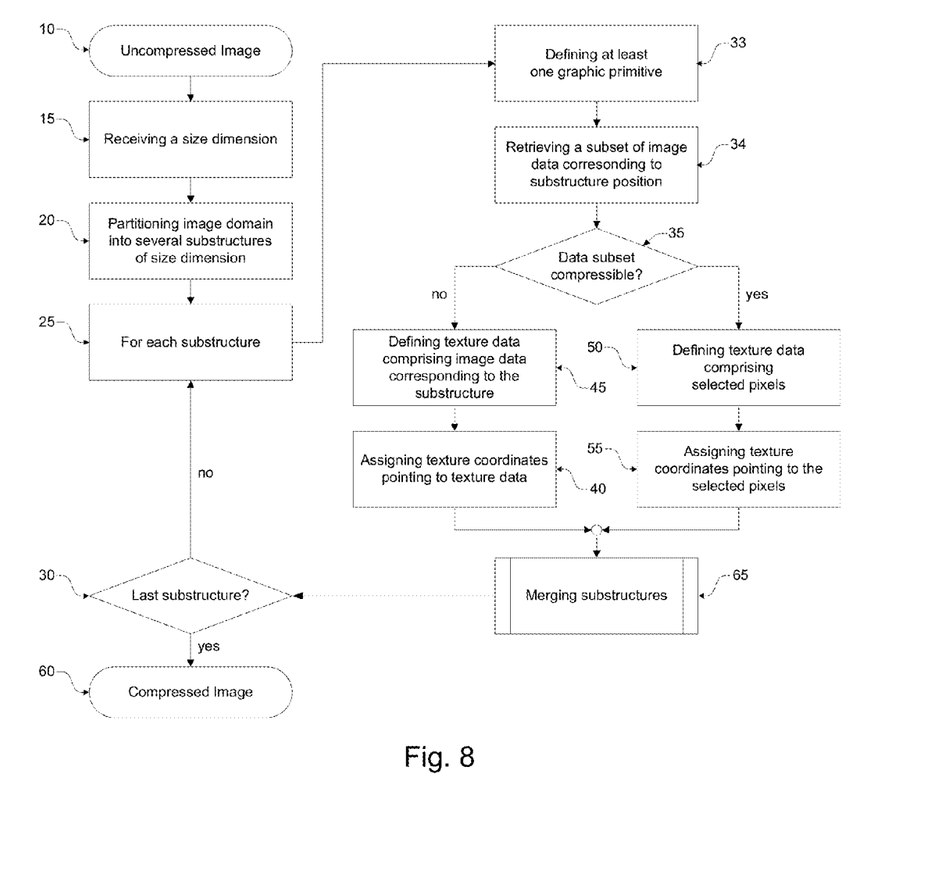
FIG. 8 schematically shows a flow chart of an example of an image compressing encoding method according to an example of the present application.

With reference to FIG. 8, an example of a flow diagram of the compression encoding method operable with the encoder 300 is illustratively shown. The image data of the uncompressed image is provided (cf. 10). At least a size dimension is provided (cf. 15). The size may be defined in order to partition the image domain into an integer number of substructures each one size corresponding to one of the at least one provided size dimension. The size dimension(s) of the substructures may be further defined in accordance with the texture tile size of the target graphics subsystem, at which the finally obtained compressed image is to be decoded or uncompressed. The target graphics subsystem may have a limitation of the supported size of textures. The defining of the size dimension(s) of the substructures allows for considering such limitations. Moreover, as explained below in more detail, the size dimension(s) of the substructures may be also defined by taking into account the properties of the image to be compressed, in particular the size of subsections of the image, the pixels of which parts have the same values. The size dimension may be varied in order to determine at least one size dimension of the substructures resulting to a compressed image having an optional size. The at least one optional size dimension may be a trade off between size of the compressed image and the capabilities and resource requirements of the target graphics subsystem.

In accordance with the defined substructure size, the image domain is partitioned into several substructures (cf. 20), in particular an integer number of substructures.

For each substructure (cf. 25), at least one geometric primitive is defined (cf. 33). The at least one geometric primitive is defined by assigning a set of vertices, which defines the positioning of the at least one geometric primitive in the image domain with respect to the image space. Accordingly, the at least one geometric primitive represents the geometry of the respective substructure and the positioning of the respective substructure with respect to the image space. Each vertex comprises for instance a two-dimensional position information, a coordinate, defining the positions x and y with respect to a predefined coordinate origin of the image space, which may be for instance located at the top left corner of the image as exemplarily illustrated in FIG. 6.

The so-called geometric primitive is a basic geometric object supported by the target graphics subsystem. For instance, a substructure may be defined to comprise N×M pixels of the image. The set of vertices may comprise four vertices, which define two triangle primitives sharing two vertices. Provided that only rectangular substructures are defined, two vertices may be sufficient to define such a rectangular substructure, e.g. the coordinates 90 and 93 illustratively shown in FIG. 6. Those skilled in the art will understand that the compression encoding method as described is not limited to rectangular substructures or to any specific primitive for defining an image subsection defined by each substructure. The geometry of the substructures may differ. Each substructure spans a simply connected domain, which is a subdomain of the domain defined by the image and the totality of substructures defines a simply connected domain equal to the domain spanned by the image, wherein the substructures do not overlap each other, e.g., the domains of the substructure are disconnected.

Further, the subset of data of the image corresponding to the respective substructure is retrieved (cf. 34) and the pixel values of the retrieved subset of data of the image are analyzed in order to determine whether the image data of the subset is compressible on the basis of a texture mapping operation in pixel value space (cf. 35).

If the pixels of the retrieved subset of the image data are reconstructable or derivable from one or more selected pixels on the basis of a texture mapping operation in pixel value space and the selected pixels are input parameters to the texture mapping operation, a texture image in compressed form is defined. This means that texture image data is defined, which comprises the selected pixels, which are representative of the pixel of the retrieved subset of the image data. Texture coordinates are generated (cf. 50) for the set of vertices defining the analyzed substructure to point to the selected pixels of the texture image for the analyzed substructure (cf. 55).

Otherwise, if the pixels of the retrieved subset of the image data are not reconstructable or derivable from selected pixels representative of the pixel of the retrieved subset of the image data, texture image data in uncompressed form is defined.

This means that texture image data is defined, which comprises the pixels with values of the subset of image data corresponding to the analyzed substructure. Texture coordinates are generated (cf. 40) for the set of vertices defining the analyzed substructure to point to the texture image data for this analyzed substructure (cf. 45). The subset of data of the uncompressed image, which corresponds to the analyzed substructure, may be copied or extracted to create the texture image data.

As described below with reference to FIGS. 10 and 11 in more detail, two or more substructures may be merged (cf. 65) into a composed substructure to further compress the image data.

Figure 7:
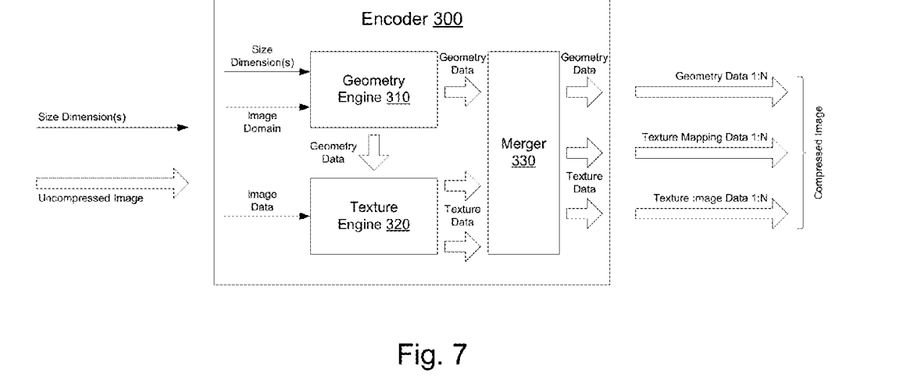
FIG. 7 schematically shows a block diagram of an encoder applicable for implementing an image encoding operation according to an example of the present application.

If the last substructure has been analyzed (cf. 30), the geometry data (vertices), the texture mapping data (texture coordinates, vectors pointing to the texture image data) and the texture image data is determined, the set of which represents the data of the image in compressed form (cf. 60 and FIG. 7).

An exemplary encode 300, which is configured to operate the above described image compression methodology is schematically illustrated in FIG. 7.

The exemplary encoder 300 comprises a geometry engine 310, a texture engine 320 and an optional substructure merger 330. The encoder 300 is provided with at least one data input and data output, which may be for instance provided by an application interface (API), which specifies how the encoder 300 implemented as a software component interacts with each other software components and operating system of a processing device such as the exemplary processing devices schematically illustrated in FIGS. 1 and 2 and described above with reference thereto. It should be understood that the geometry engine 310, texture engine 320 and substructure merger 330 are referred to for the sake of intelligibility and illustration. The encoder 300 should not be understood as being limited to those subcomponents. In particular, the functionality of those subcomponents 310, 320 and 330 may be implemented differently without departing from the scope of the present invention. The encoder 300 is arranged to receive image data of an image in uncompressed form and at least one size dimension. The image data and the size dimension may be read from a memory or supplied from the memory to the encoder 300.

The geometry engine 310 is arranged to receive at least information about the domain of the image, which is part of the image data. The image domain should be understood to at least refer to the size dimensions of the image such as image width and image height in numbers of pixels. The at least one size dimension of the substructures may be also defined with respect of numbers of pixels in width and height of the substructures.

The geometry engine 310 is for instance configured to partition the image domain into the several substructures, each of which having one of the at least one size dimension and to define at least one geometric primitive for each substructure on the basis of geometry data. The geometry data defines a positional arrangement of the at least one geometric primitive in the image space. The at least one geometric primitive represents geometrically the substructure. This means that each substructure is defined on the basis of the at least one geometric primitive.

The texture engine 320 is operatively coupled to the geometry engine 310 and arranged to receive the geometry data from the geometry engine 310.

The texture engine 320 is for instance configured to retrieve a subset of data of the image corresponding to the substructure and determine whether the image data of the subset is compressible on the basis of a texture mapping operation in pixel value space.

If the pixel of the retrieved subset of the image data are reconstructable or derivable from one or more selected pixels as input parameters for a texture mapping operation in pixel value space then the texture engine 320 is further configured to define data of a texture image in compressed form. The data thereof comprises selected pixels, which are representative of the pixel of the retrieved subset of the image data. The texture engine 320 is further configured to assign texture mapping data to the geometry data of the substructure for mapping the defined texture image onto the at least one geometric primitive of the substructure.

Otherwise if the pixels of the retrieved subset of the image data are not reconstructable or derivable from selected pixels representative of the pixel of the retrieved subset of the image data, then the texture engine 320 is further configured to define data of a texture image in uncompressed form. The data thereof comprises pixels having values corresponding to the pixel values of the retrieved subset of image data, and assign texture mapping data to the geometry data of the substructure for mapping the defined texture image onto the at least one geometric primitive of the substructure.

The encoder 300 is configured to output the data of the image in compressed form, the data of which comprises the geometry data, the texture mapping data and the texture image data for each substructure.

The substructure merger 330 is operatively coupled to the geometry engine 310 and the texture engine 320 and arranged to receive geometry data from the geometry engine 310 and texture data comprising texture mapping data and texture image data from the texture engine 320.

The substructure merger 330 is for instance configured to merge at least two adjacent substructures into a new merged substructure replacing the at least two adjacent substructures and having the positioning of the at least two adjacent substructures. The merging of substructures and the functionality of the substructure merger 330 will be described below in detail with reference to FIGS. 10 and 11.

Figure 9:
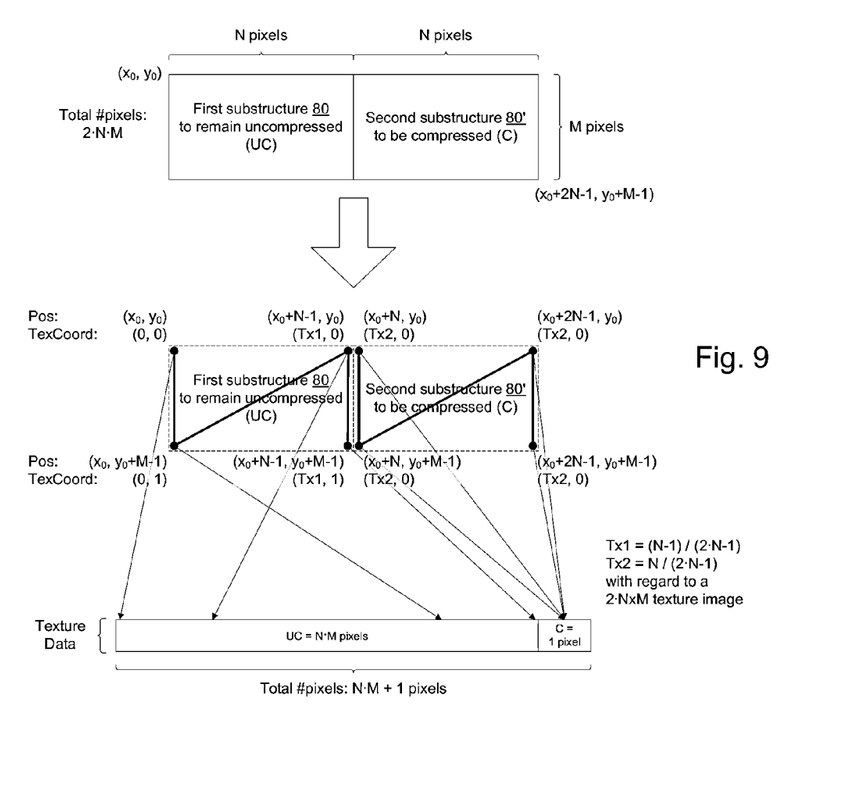
FIG. 9 schematically shows a block diagram further illustrating the image compressing encoding operation with respect to FIGS. 6 and 8.

FIG. 9 schematically illustrates an exemplary uncompressed image having a size of 2·N·M pixels. The image should be considered to be composed of two substructures with rectangular geometry. The first substructures having a size of N·M pixels should be assumed not to be compressible whereas the second substructures having also a size of N·M pixels should be assumed to be compressible. In view of the above teaching, this means that at least two pixel values of the image data corresponding to the first substructures differ from each other and the pixel values of the image data corresponding to second substructures are the same. Each rectangular substructure is defined on the basis of a set of four vertices. Each set of vertices defines two triangles representing the geometric primitives representing the substructures.

The space spanned by the image may be defined with respect to a coordinate origin. The image pixel of the top left corner of image may have the position coordinate $(x_0, y_0)$ and the image pixel of the bottom right corner of image may have the position coordinate $(x_0+2N-1, y_0+M-1)$, the top left corner may be $(x_0, y_0)=(0, 0)$.

The four vertices of the set defining the two triangles defining the geometry of the first substructure of the image have the position coordinates $(x_0, y_0)$, $(x, y_0+M-1)$, $(x_0+N-1, y_0)$ and $(x+N-1, y_0+M-1)$. The first triangle is described by the position coordinates $(x_0, y_0)$, $(x, y+M-1)$ and $(x_0+N-1, y_0)$ and the second triangle is described by the position coordinates $(x_0, y_0+M-1)$, $(x_0+N-1, y_0)$ and $(x_0+N-1, y_0+M-1)$ with respect to the image space.

The four vertices of the set defining the two triangles defining the geometry of the second substructure of the image have the position coordinates $(x_0+N, y_0)$, $(x_0+N, y_0+M-1)$, $(x_0+2N-1, y_0)$ and $(x_0+2N-1, y_0+M-1)$. The first triangle is described by the position coordinates $(x_0+N, y_0)$, $(x_0+N, y_0+M-1)$ and $(x_0+2N-1, y_0)$ and the second triangle is described by the position coordinates $(x_0+N, y_0+M-1)$, $(x_0+2N-1, y_0)$ and $(x_0+2N-1, y_0+M-1)$ with respect to the image space.

As already aforementioned, the first substructure should be considered as incompressible. Accordingly, the image data corresponding to the first substructure of the image may be extracted or copied to create the data defining the texture image, which is applied to fill the surface of the triangle primitives defining the geometry of the first substructure. The second substructure should be considered as compressible. This means that selected pixels are defined, which are representative of the data of the texture image, which is applied to fill the surface of the triangle primitives defining the geometry of the second substructure. In the illustrative example shown in FIG. 9, it should be assumed that the pixel values of the second substructure have the same value in color space or at least similar values within a distance in color space.

For the sake of example, the texture coordinates as shown in FIG. 9 point to the texture image comprising the texture image data for the two triangles defining the first substructure and the two triangles defining the second substructure. The following texture coordinates are defined with respect to a texture image size of 2·N·M pixels.

Accordingly, the first triangle primitive of the first substructure is geometrically defined by the vertices (x, y) with the position coordinates $(x_0, y_0)$, $(x_0, y_0+M-1)$ and $(x_0+N-1, y_0)$ and has assigned the texture coordinates (vectors pointing to the two-dimensional texture image coordinates) (0, 0), (0, 1) and $$\left(\frac{N-1}{2 \cdot N-1}, 0\right)$$

and the second triangle primitive of the first substructure is geometrically defined by the vertices (x, y) with the position coordinates $(x_0, y_0+M-1)$, $(x_0+N-1, y_0)$ and $(x_0+N-1, y_0+M-1)$ has assigned the texture coordinates (vectors pointing to the two-dimensional texture image coordinates) (0, 1), $$\left(\frac{N-1}{2 \cdot N-1}, 0\right)$$

and $$\left(\frac{N-1}{2 \cdot N-1}, 1\right).$$

The first triangle primitive of the second substructure is geometrically defined by the vertices (x, y) with the position coordinates $(x_0+N, y_0)$, $(x_0+N, y_0+M-1)$ and $(x_0+2\cdot N-1, y_0)$ and has assigned the texture coordinates (vectors pointing to the two-dimensional texture image coordinates)

$$\left(\frac{N}{2 \cdot N-1}, 0\right), \left(\frac{N}{2 \cdot N-1}, 0\right)$$

and $$\left(\frac{N}{2 \cdot N-1}, 0\right)$$

and the second triangle primitive of the second substructure is geometrically defined by the vertices (x, y) with the position coordinates $(x_0+N, y_0+M-1)$, $(x_0+2\cdot N-1, y_0)$ and $(x_0+2\cdot N-1, y_0+M-1)$ has assigned the texture coordinates (vectors pointing to the two-dimensional texture image coordinates)

$$\left(\frac{N}{2 \cdot N-1}, 0\right), \left(\frac{N}{2 \cdot N-1}, 0\right)$$

and $$\left(\frac{N}{2 \cdot N-1}, 0\right).$$

The texture image data of the first substructure may be denoted as uncompressed whereas the texture image data of the second substructure may be denoted as compressed. The finally created texture image data comprises N·M+1 pixels in total, which can be considered as a significant reduction of the number of pixels in comparison with the 2·N·M pixels of the uncompressed image even if considering that the amount of data required for the position coordinates and the texture coordinates have to be considered when comparing the amount of data required for the uncompressed image and the amount of data required for the compressed image. However, the reduction of the data size is only one target of the compression encoding method of present application; another target of the compression encoding method of present application is to enable decompressing/decoding at the graphics subsystem 200 resulting in a significant reduction of data transfer bandwidth at the processing device displaying the compressed image.

Two or more substructures may be merged into one substructure. With regard to FIG. 10, a schematic illustration of a merging of two substructures 80 and 80' is exemplified. Assume that the image comprises two substructures adjacent to each other. The phrase adjacent substructures may be understood to refer to substructures, which have one common edge and which have adjoining edges, respectively.

Figure 10:
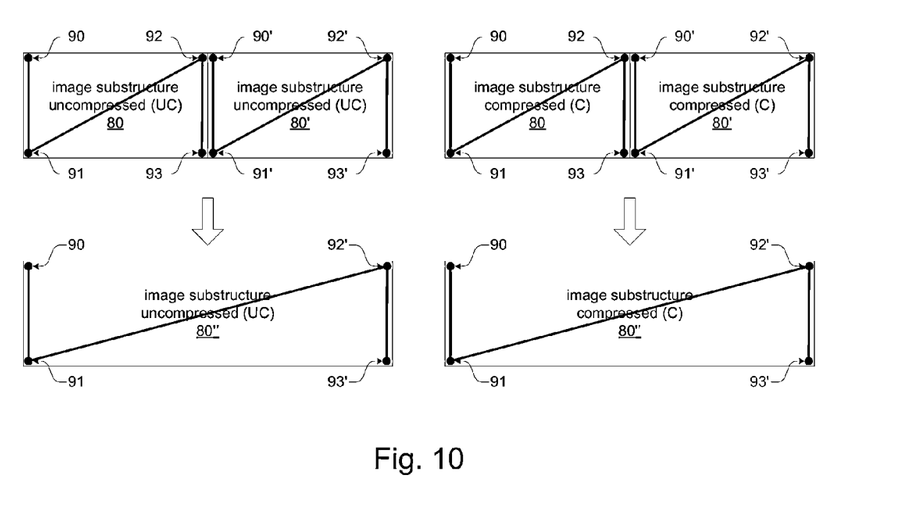
FIG. 10 schematically shows a flow diagram of examples of a merging operation in accordance with an example of the present application.

The left hand schematic illustration in FIG. 10 relates to a merging of substructures 80 and 80', each of which has assigned an uncompressed texture image. This means that each of the texture images comprises texture image data, which corresponds to the subset of data of the image corresponding to the respective substructure 80, 80'. The right hand schematic illustration in FIG. 10 relates to a merging of substructures 80 and 80', each of which has assigned a compressed texture image with one pixel of representative the same value. This means that each of the texture images comprises compressed texture image data having a single pixel with a value. The values of the pixels of the compressed texture images are equal. The both illustrations of FIG. 10 exemplify conditions, which have to be complied with to enable merging.

In FIG. 10, the substructures 80 and 80' are aligned in x or width direction and have a common and adjoining edge aligned in y or height direction. In order to merge the substructures the two substructures 80 and 80' are replaced with one new substructure 80". The new substructure 80" has a size dimension equal to the sum of the size dimensions of the two adjacent substructures 80, 80'. The positioning of the new substructure 80" is defined to cover the positioning taken by the two adjacent substructures 80, 80'.

This means that the geometric primitives, on the basis of the two adjacent substructures 80, 80' are defined, are replaced by at least one geometric primitive on the basis of which the geometry of the new substructure 80" is defined. As exemplarily shown in FIG. 10, each of the two adjacent substructures 80, 80' is defined on the basis of two triangle primitives defined on the basis of the vertices 90 to 93 and the vertices 90' to 93', respectively. The new substructure 80" is defined in turn on the basis of two triangle primitives defined on the basis of the vertices 90, 91, 92' and 93'. As understood from the example shown in FIG. 10, vertices defined in accordance with substructures 80, 80' to be replaced may be adopted for the new replacing substructure 80". The positioning of the new substructure 80" is defined to take the positioning of the two replaced substructures 80 and 80'. The same applies to the triangle primitives, e.g., the positioning of the newly defined triangle primitives for the new substructure 80" cover the positioning of the four triangle primitives of the two adjacent substructures 80 and 80'.

In case the two adjacent substructures 80, 80' have assigned uncompressed texture image data, the texture image data thereof is joined and the texture mapping data (texture coordinates of the vertices) is accordingly adapted if necessary (cf. left hand illustration of FIG. 10).

In case the two adjacent substructures has assigned compressed texture image data with the same pixel value, text image data is defined with a single pixel having that same (common) value. The texture mapping data (texture coordinates of the vertices) is accordingly adapted (cf. right hand illustration of FIG. 10).

Figure 11:
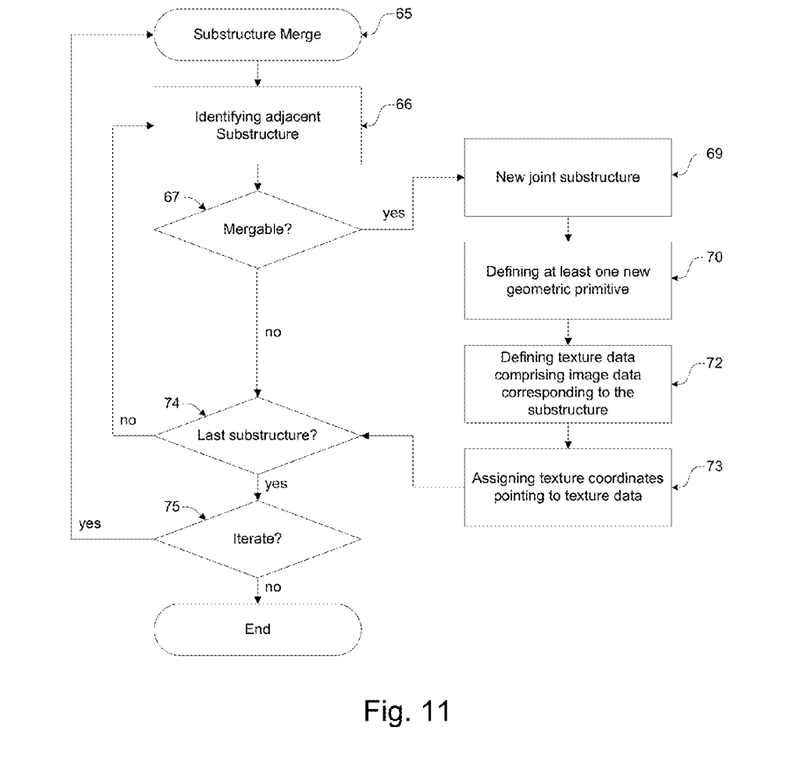
FIG. 11 schematically shows a flow chart of an example of a merging operation in accordance with an example of the present application.

FIG. 11 schematically illustrates an example of a flow diagram of the substructure merging operation. Adjacent substructures are identified (cf. 66). The substructures may further have the same dimension with regard to their common edge; i.e., the edge which respect to which the substructures are adjacent to each other.

The identified substructures are analyzed whether a merging thereof is feasible (cf. 67). A merging is feasible in case both identified substructures have assigned uncompressed texture image data or in case both identified substructures have assigned compressed texture image data, which are compatible. The compressed texture image data is compatible if the texture image data of the two adjacent substructures are describable on the basis of a common texture mapping operation in the pixel value space of the texture image.

If the texture image data of the identified substructures allow for merging, a new merged substructure geometrically covering the identified substructures is provided (cf. 69). At least one geometric primitive of the substructure is defined for the new merged substructure on the basis of geometry data defining a positioning (positional arrangement) of the at least one new geometric primitive within the image space (cf. 70). The at least one new geometric primitive represents geometrically the new merged substructure. In case the identified substructures have assigned uncompressed texture image data, the texture image data thereof is joined (cf. 72) and the texture mapping data (texture coordinates of the vertices) is accordingly adapted if necessary (cf. 73).

In case the two adjacent substructures has assigned compressed texture image data with the same representative pixel value or similar representative pixel values with respect to a predefined distance in color space, text image data is defined (cf. 72) with a single pixel having that same (common or averaged) representative pixel value. In case the two adjacent substructures has assigned compressed texture image data representative of a color gradient, which extends over the two adjacent substructure, text image data is defined (cf. 72) with pixel values corresponding to initial gradient values and pixels with pixel values corresponding to final gradient values representative of the color gradient expending over the two adjacent substructure. The texture mapping data (texture coordinates of the vertices) is accordingly adapted (cf. 73).

The process of merging may be repeated until the substructures, which are available at a given point in time, are checked for merging (cf. 74). Moreover, the process of merging may be (iteratively) repeated to allow for checking whether merged substructures may be further merged.

On the basis of the detailed description above, those skilled in the art immediately understand an exemplary implementation of the substructure merger 330 referred to with reference to FIG. 8. In particular, the substructure merger 330 is configured to identify at least two adjacent substructures and analyse whether the identified substructures are mergable. Further, the substructure merger 330 is configured to define the new merged substructure on the basis of at least one geometric primitive and the assign a merged texture image to the least one geometric primitive of the new merged substructure. The merged texture image may be either a compressed texture image or an uncompressed texture image. The compressed texture image has a single pixel with a value being equal to the pixel value of the texture images of the replaces substructures. The uncompressed texture image results from a merging of the texture images of the replaces substructures. The texture mapping data (texture coordinates) is adapted by the substructure merger 330 if necessary.

Figure 12:
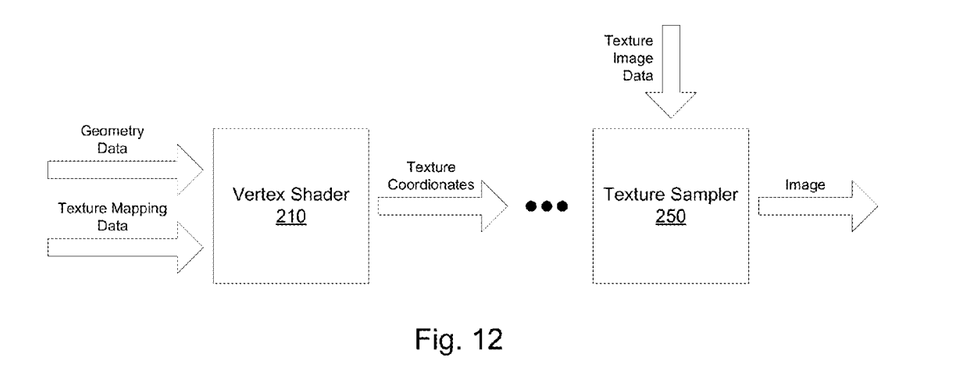
FIG. 12 schematically shows a flow chart of an example of an image compression decoding operation in accordance with an example of the present application.

With reference to FIG. 12, the finally obtained compressed image may be decompressed or decoded by making use of the functionality of a graphics pipeline such the exemplary graphics pipeline illustratively shown in FIG. 3. The data of the compressed image comprises geometry data (sets of vertices), texture mapping data (texture coordinates assigned to the vertices) and texture image data. The geometry data and the texture mapping data is provided to the vertex shader 210, which generates display representations of the geometric primitives in accordance with the geometric positioning defined by the geometry data. The texture sampler 250 fills the display representations of the geometric primitives with texture as defined by the texture coordinates pointing to subsets of the texture image data. The components of the graphics pipeline generate a display representation of the uncompressed image, which will be for instance finally displayed to a user on a display.

Notably, the invention may be implemented in a computer program for running on a computer system, for example as explained above with reference to FIGS. 1 and 2. The computer system may comprise at least a processor operatively coupled to a memory for implementing the invention of the present application. The computer program may include at least code portions for performing of a method according to the invention when run on a programmable apparatus, such as a computer system or enabling a programmable apparatus to perform functions of a device or system according to the invention.

A computer program is a list of instructions such as a particular application program and/or an operating system.

The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media are non-transitory, tangible computer-readable media. Such non-transitory, tangible computer-readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between the illustrated logic blocks and/or functional elements are merely illustrative and that alternative embodiments may merge blocks or elements or impose an alternate decomposition of functionality upon various blocks or elements. Thus, it is to be understood that the architectures depicted herein are merely exemplary, and that in fact many other architectures can be implemented which achieve the same functionality.

Any arrangement of components to achieve the same functionality is effectively associated such that the desired functionality is achieved. Hence, any two components herein combined to achieve a particular functionality can be seen as associated with each other such that the desired functionality is achieved, irrespective of architectures or intermedial components. Likewise, any two components so associated can also be viewed as being operably connected, or operably coupled, to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be at least partly implemented as circuitry located on a single integrated circuit or within a same device. For example, one or more components of the encoder 300 of FIG. 7 may be implemented on the basis of an integrated circuit. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems".

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processing device for compressing an image, said processing device comprises at least a processor operatively coupled to a memory and an encoder, wherein said memory is configured to provide data of an image and at least one size dimension to the encoder,
   wherein said encoder is configured to receive said data of said image and said at least one size dimension from said memory and comprises a geometry engine, which is further configured to partition the image domain into several substructures each having one of the at least one size dimension; and to define at least one geometric primitive for each substructure on the basis of geometry data defining a positioning of the at least one geometric primitive within the image space, wherein said at least one geometric primitive represents geometrically the substructure, wherein said encoder further comprises a texture engine, which is configured for each substructure to retrieve a subset of data of the image corresponding to the substructure;

to determine whether pixels of the retrieved subset are reconstructable from one or more selected pixels as input parameters on the basis of a texture mapping operation in the pixel value space, wherein the selected pixels are representative of the subset of image data and input parameters to the texture mapping operation in pixel value space;

if the pixels of the retrieved subset are reconstructable to define data of a texture image in compressed form with the selected pixels;

otherwise to define data of a texture image in uncompressed form, which data corresponds to the retrieved subset of image data; and to assign texture mapping data to the geometry data of the substructure for mapping the defined texture image onto the at least one geometric primitive of the substructure, wherein a compressed form of said image comprises the geometry data, the texture mapping data and the texture image data for each substructure.

2. The processing device of claim 1, wherein said encoder is further configured to determine whether the pixel values of the retrieved subset are at least similar with respect to a distance in color space, and to define the data of the texture image in compressed form, which has one selected pixel with a pixel value representative of the similar pixel values of the retrieved subset.

3. The processing device of claim 1, wherein said encoder is further configured to determine whether the pixel values of the retrieved subset change in accordance with a color gradient within a predefined variation range in color space, and to define the data of the texture image in compressed form, the data of which has selected pixels with values representative of initial gradient values and final gradient values.

4. The processing device of claim 1, wherein said encoder is further configured to define a set of vertices for the at least one geometric primitive of each substructure, wherein each vertex comprises an image coordinate defining a positioning within image space, wherein the image coordinates form the geometry data, wherein each vertex has further assigned a texture coordinate, which defines a positioning within texture image space, wherein the texture coordinates form the texture mapping data.

5. The processing device of claim 1, wherein the at least one geometric primitive defining the substructure comprises two triangle primitives, wherein said two triangle primitives are defined on the basis of four image coordinates, wherein a texture mapping coordinate is assigned to each of the image coordinates.

6. The processing device of claim 1, wherein said substructure is rectangular, wherein said rectangular substructure is defined on the basis of two image coordinates, wherein a texture mapping coordinate is assigned to each of the image coordinates.

7. The processing device of claim 1, wherein said image is a simply connected domain, wherein each geometric primitive is a simply connected domain, wherein the domains of the geometric primitive are subdomains of the image domain, wherein the domains of the geometric primitives are disconnected, wherein said totality of geometric primitives defines a simply connected domain corresponding to the image domain.

8. The processing device of claim 1, wherein said encoder further comprises a merger, which is configured to merge at least two substructures, which are adjacent to each other and which have assigned texture images in uncompressed form or which have assigned texture images in compressed form with the same pixel value.

9. A method of compressing an image, comprising:

providing data of an image;

providing at least one size dimension;

partitioning the image domain into several substructures each having one of the at least one size dimension; and defining at least one geometric primitive for each substructure on the basis of geometry data defining a positioning of the at least one geometric primitive within the image space, wherein said at least one geometric primitive represents geometrically the substructure, wherein said method further comprises for each substructure:

retrieving a subset of data of the image corresponding to the substructure;

determining whether pixels of the retrieved subset are reconstructable from one or more selected pixels on the basis of a texture mapping operation in the pixel value space, wherein the selected pixels are representative of the subset of image data and input parameters to the texture mapping operation in pixel value space;

if the pixels of the retrieved subset are reconstructable, then defining data of a texture image in compressed form with the selected pixels;

otherwise defining data of a texture image in uncompressed form, which data corresponds to the retrieved subset of image data; and assigning texture mapping data to the geometry data of the substructure for mapping the defined texture image onto the at least one geometric primitive of the substructure, wherein a compressed form of said image comprises the geometry data, the texture mapping data and the texture image data for each substructure.

10. The method of claim 9 determining whether the pixel values of the retrieved subset are at least similar with respect to a distance in color space, and defining the data of the texture image in compressed form, which has one selected pixel with a pixel value representative of the similar pixel values of the retrieved subset.

11. The method of claim 9 determining whether the pixel values of the retrieved subset change in accordance with a color gradient within a predefined variation range in color space, and defining the data of the texture image in compressed form, the data of which has selected pixel with values representative of initial gradient values and final gradient values.

12. The method of claim 9, wherein said partitioning the image domain into several substructures further comprises:
defining a set of vertices for the at least one geometric primitive of each substructure,
wherein each vertex comprises an image coordinate defining a positioning within image space, wherein the image coordinates form the geometry data,
wherein each vertex has further assigned a texture coordinate, which defines a positioning within texture image space, wherein the texture coordinates form the texture mapping data.

13. The method of claim 9,
wherein the at least one geometric primitive defining the substructure comprises two triangle primitives, wherein said two triangle primitives are defined on the basis of four image coordinates, wherein a texture mapping coordinate is assigned to each of the image coordinates.

14. The method of claim 9,
wherein said substructure is rectangular, wherein said rectangular substructure is defined on the basis of two image coordinates, wherein a texture mapping coordinate is assigned to each of the image coordinates.

15. The method of claim 9, further comprising:
merging at least two substructures, which are adjacent to each other and which have assigned texture images in uncompressed form or which have assigned texture images in compressed form, which are compatible with respect to the texture mapping operation.

16. The method of claim 9,
wherein said image is a simply connected domain,
wherein each geometric primitive is a simply connected domain,
wherein the domains of the geometric primitive are subdomains of the image domain,
wherein the domains of the geometric primitives are disconnected,
wherein said totality of geometric primitives defines a simply connected domain corresponding to the image domain.

17. A non-transitory, tangible computer-readable storage medium having stored thereon a computer program for compressing an image, the computer program comprising a set of instructions, which, when executed on a processing system, cause the processing system to perform the method comprising:
providing data of an image;
providing at least one size dimension;
partitioning the image domain into several substructures each having one of the at least one size dimension; and
defining at least one geometric primitive for each substructure on the basis of geometry data defining a positioning of the at least one geometric primitive within the image space, wherein said at least one geometric primitive represents geometrically the substructure,
wherein said method further comprises for each substructure:
retrieving a subset of data of the image corresponding to the substructure;
determining whether pixels of the retrieved subset are reconstructable from one or more selected pixels on the basis of a texture mapping operation in the pixel value space, wherein the selected pixels are representative of the subset of image data and input parameters to the texture mapping operation in pixel value space;
if the pixels of the retrieved subset are reconstructable, then defining data of a texture image in compressed form with the selected pixels;
otherwise defining data of a texture image in uncompressed form, which data corresponds to the retrieved subset of image data; and
assigning texture mapping data to the geometry data of the substructure for mapping the defined texture image onto the at least one geometric primitive of the substructure,
wherein a compressed form of said image comprises the geometry data, the texture mapping data and the texture image data for each substructure.

18. The non-transitory, tangible computer-readable storage medium of claim 17, wherein the method further comprises:
determining whether the pixel values of the retrieved subset are at least similar with respect to a distance in color space, and
defining the data of the texture image in compressed form, which has one selected pixel with a pixel value representative of the similar pixel values of the retrieved subset.

19. The non-transitory, tangible computer-readable storage medium of claim 17, wherein the method further comprises:
determining whether the pixel values of the retrieved subset change in accordance with a color gradient within a predefined variation range in color space, and
defining the data of the texture image in compressed form, the data of which has selected pixel with values representative of initial gradient values and final gradient values.

20. The non-transitory, tangible computer-readable storage medium of claim 17, wherein said partitioning the image domain into several substructures further comprises:
defining a set of vertices for the at least one geometric primitive of each substructure,
wherein each vertex comprises an image coordinate defining a positioning within image space, wherein the image coordinates form the geometry data,
wherein each vertex has further assigned a texture coordinate, which defines a positioning within texture image space, wherein the texture coordinates form the texture mapping data.

* * * * *